US009010185B2

(12) United States Patent
Tsai et al.

(10) Patent No.: US 9,010,185 B2
(45) Date of Patent: Apr. 21, 2015

(54) THREE-DIMENSIONAL MICRO-ELECTRO-MECHANICAL-SYSTEM SENSOR

(75) Inventors: Ming-Han Tsai, Hsin-Chu (TW); Chih-Ming Sun, Hsin-Chu (TW)

(73) Assignee: Pixart Imaging Incorporation, R.O.C., Hasin-Chu (TW)

( * ) Notice: Subject to any disclaimer, the term of this patent is extended or adjusted under 35 U.S.C. 154(b) by 430 days.

(21) Appl. No.: 13/482,989

(22) Filed: May 29, 2012

(65) Prior Publication Data
US 2013/0139595 A1    Jun. 6, 2013

(30) Foreign Application Priority Data
Dec. 2, 2011    (TW) .............................. 100144294 A

(51) Int. Cl.
*G01P 15/125*    (2006.01)
*G01P 15/18*    (2013.01)
*G01P 15/08*    (2006.01)

(52) U.S. Cl.
CPC .............. *G01P 15/125* (2013.01); *G01P 15/18* (2013.01); *G01P 2015/082* (2013.01); *G01P 2015/084* (2013.01); *G01P 2015/0845* (2013.01)

(58) Field of Classification Search
CPC ..... G01P 15/125; G01P 15/082; G01P 15/18; G01P 15/131; G01P 15/0888
USPC ............... 73/514.32, 514.38, 514.36, 514.24, 73/514.15, 510
See application file for complete search history.

(56) References Cited

U.S. PATENT DOCUMENTS

| 5,326,726 | A | | 7/1994 | Tsang et al. |
| 5,847,280 | A | | 12/1998 | Sherman et al. |
| 5,880,369 | A | | 3/1999 | Samuels et al. |
| 5,894,091 | A | * | 4/1999 | Kubota ........................ 73/504.12 |
| 6,148,670 | A | * | 11/2000 | Judy ............................ 73/514.32 |
| 6,402,968 | B1 | | 6/2002 | Yazdi et al. |
| 6,792,804 | B2 | | 9/2004 | Adams et al. |
| 6,845,670 | B1 | | 1/2005 | McNeil et al. |
| 6,877,374 | B2 | | 4/2005 | Geen |
| 6,892,576 | B2 | | 5/2005 | Samuels et al. |
| 7,138,694 | B2 | | 11/2006 | Nunan et al. |
| 7,258,011 | B2 | | 8/2007 | Nasiri et al. |

(Continued)

OTHER PUBLICATIONS

Ming-Han Tsai et al., A CMOS-MEMS Accelerometer with Tri-axis Sensing Electrodes Arrays, Proc. Engineering 5 (2010) 1083-1086, published by Elsevier Ltd. Available online at www.sciencedirect.com.

*Primary Examiner* — Helen Kwok
(74) *Attorney, Agent, or Firm* — Tung & Associates

(57) ABSTRACT

The present invention discloses a three-dimensional micro-electro-mechanical-system sensor. The sensor includes movable first electrodes, plural movable second electrodes, plural fixed third electrodes, and plural fixed fourth electrodes. The first electrodes and their adjacent third electrodes form at least one first capacitor and at least one second capacitor, and the second electrodes and their adjacent fourth electrodes form at least one third capacitor. The capacitance change of the first capacitor reflects the displacement of the proof mass along a first axis, the capacitance change of the second capacitor reflects the displacement of the proof mass along a second axis, and the capacitance change of the third capacitor reflects the displacement of the proof mass along a third axis. The first, second, and third axes define a three-dimensional coordinate system.

22 Claims, 7 Drawing Sheets

(56) References Cited

U.S. PATENT DOCUMENTS

| | | | |
|---|---|---|---|
| 7,293,460 B2* | 11/2007 | Zarabadi et al. | 73/514.32 |
| 7,600,428 B2* | 10/2009 | Robert et al. | 73/514.32 |
| 8,459,115 B2* | 6/2013 | Wang | 73/514.32 |
| 8,479,576 B2* | 7/2013 | Wang | 73/514.32 |
| 2006/0260401 A1* | 11/2006 | Xie | 73/514.32 |
| 2007/0180912 A1 | 8/2007 | Judy et al. | |
| 2010/0288047 A1* | 11/2010 | Takagi | 73/514.32 |
| 2011/0303009 A1* | 12/2011 | Yang et al. | 73/514.32 |

\* cited by examiner

THREE-DIMENSIONAL MICRO-ELECTRO-MECHANICAL-SYSTEM SENSOR

CROSS REFERENCE

The present invention claims priority to TW 100144294, filed on Dec. 2, 2011.

BACKGROUND OF THE INVENTION

1. Field of Invention

The present invention relates to a three-dimensional Micro-electro-mechanical-system sensor, in particular to such a MEMS sensor which integrates in-plane electrodes with out-of-plane electrodes along a vertical direction.

2. Description of Related Art

MEMS devices are used in a wide variety of products, of which one application is capacitance-type sensors, such as accelerometer, microphone, etc. There are two types of such sensors, i.e., in-plane sensors and out-of-plane sensors. The former ones are used to sense a capacitance variation in a horizontal direction (x-y plane), and the latter ones are used to sense the capacitance variation in a vertical direction (z axis). With respect to in-plane sensors and methods for making such sensors, prior art U.S. Pat. Nos. 5,326,726; 5,847,280; 5,880,369; 6,877,374; 6,892,576; and U.S. publication No. 2007/0180912 disclose several examples. With respect to out-of-plane sensors and methods for making such sensors, prior art U.S. Pat. Nos. 6,402,968; 6,792,804; 6,845,670; 7,138,694; and 7,258,011 disclose several examples. However, these prior art references do not disclose a sensor capable of detecting the capacitance variations in three dimensions.

In view of above, the present invention overcomes the foregoing drawback by providing a three-dimensional Micro-electro-mechanical-system sensor which integrates in-plane electrodes with out-of-plane electrodes along a vertical direction. Thus, the sensing function of the sensor is improved, and the area of the MEMS device is reduced.

SUMMARY OF THE INVENTION

An objective of the present invention is to provide a MEMS sensor which integrates in-plane electrodes with out-of-plane electrodes along a vertical direction. The area of the MEMS device is reduced.

To achieve the foregoing objectives, in one aspect, the present invention provides a three-dimensional micro-electro-mechanical-system sensor comprising: a substrate; a fixed frame fixed on the substrate; a proof mass; at least one spring part connecting the fixed frame and the proof mass; a plurality of first electrodes and a plurality of second electrodes respectively extending from the proof mass toward the fixed frame; and a plurality of third electrodes and fourth electrodes respectively extending from the fixed frame toward the proof mass, wherein the first electrodes and the third electrodes form at least one first capacitor and at least one second capacitor, and the second electrodes and the fourth electrodes form at least one third capacitor; wherein a displacement of the proof mass along a first axis generates a change in the capacitance of the first capacitor; a displacement of the proof mass along a second axis generates a change in the capacitance of the second capacitor; and a displacement of the proof mass along a third axis generates a change in the capacitance of the third capacitor, wherein the first, second, and third axes define a three-dimensional coordinate system.

In one embodiment, there is at least one third electrode between two adjacent first electrodes.

In one embodiment, there are at least two third electrodes between two adjacent first electrodes.

In one embodiment, the first electrodes and the third electrodes extend along the direction of the first axis or the direction of the second axis.

In one embodiment, the second electrodes include a plurality of upper second electrodes and a plurality of lower second electrodes, and the upper second electrodes and the lower second electrodes are disposed on at least a lateral side of the proof mass in a manner that the upper second electrodes do not overlap with the lower second electrodes along the direction of the third axis.

In one embodiment, the fourth electrodes include a plurality of upper fourth electrodes and a plurality of lower fourth electrodes, and the upper fourth electrodes and the lower fourth electrodes are disposed on an internal side of the fixed frame in a manner that the upper fourth electrodes do not overlap with the lower fourth electrodes along the direction of the third axis.

In one embodiment, at least one upper second electrode and at least one lower fourth electrode overlap with each other along the third axis to form the third capacitor, and at least one lower second electrode and at least one upper fourth electrode overlap with each other along the third axis to form another third capacitor.

In one embodiment, the three-dimensional micro-electro-mechanical-system sensor further comprises a fully differential acceleration detection circuit which detects differential signals of (a) four adjacent first capacitors, (b) four adjacent second electrodes, or (c) four adjacent third electrodes and amplifies the differential signals.

In one embodiment, the three-dimensional micro-electro-mechanical-system sensor further comprises a differential acceleration detection circuit which detects differential signals of (a) two adjacent first capacitors, (b) two adjacent second electrodes, or (c) two adjacent third electrodes and amplifies the differential signals.

In one embodiment, the second electrodes include a plurality of upper second electrodes and a plurality of lower second electrodes, and there are two lower second electrodes between two adjacent upper second electrodes; the upper second electrodes and the lower second electrodes are disposed on a lateral side of the proof mass and the upper second electrodes do not overlap with the lower second electrodes along the direction of the third axis.

In one embodiment, the fourth electrodes include a plurality of upper fourth electrodes and a plurality of lower fourth electrodes, and there are two lower fourth electrodes between two adjacent upper fourth electrodes; the upper fourth electrodes and the lower fourth electrodes are disposed on an internal side of the fixed frame and the upper fourth electrodes do not overlap with the lower fourth electrodes along the direction of the third axis.

In one embodiment, the fourth electrodes are at least partially between the first electrodes and the substrate.

In one embodiment, the fourth electrodes are at least partially between the third electrodes and the substrate.

In the foregoing embodiment, the second electrodes are at least partially between the first electrodes and the substrate.

In one embodiment, the third electrodes are between the fourth electrodes and the substrate.

In the foregoing embodiment, the first electrodes are between the second electrodes and the substrate.

In one embodiment, there are four spring parts and they symmetrically connect the proof mass and the fixed frame.

In one embodiment, the fixed frame is in a form of a closed surrounding wall, a plurality of pillars, or a plurality of walls.

In one embodiment, the proof mass is movable in an in-plane direction and an out-of-plane direction relative to the plane defined by the first axis and the second axis.

The objectives, technical details, features, and effects of the present invention will be better understood with regard to the detailed description of the embodiments below, with reference to the drawings.

DESCRIPTION OF THE PREFERRED EMBODIMENTS

Figure 1:
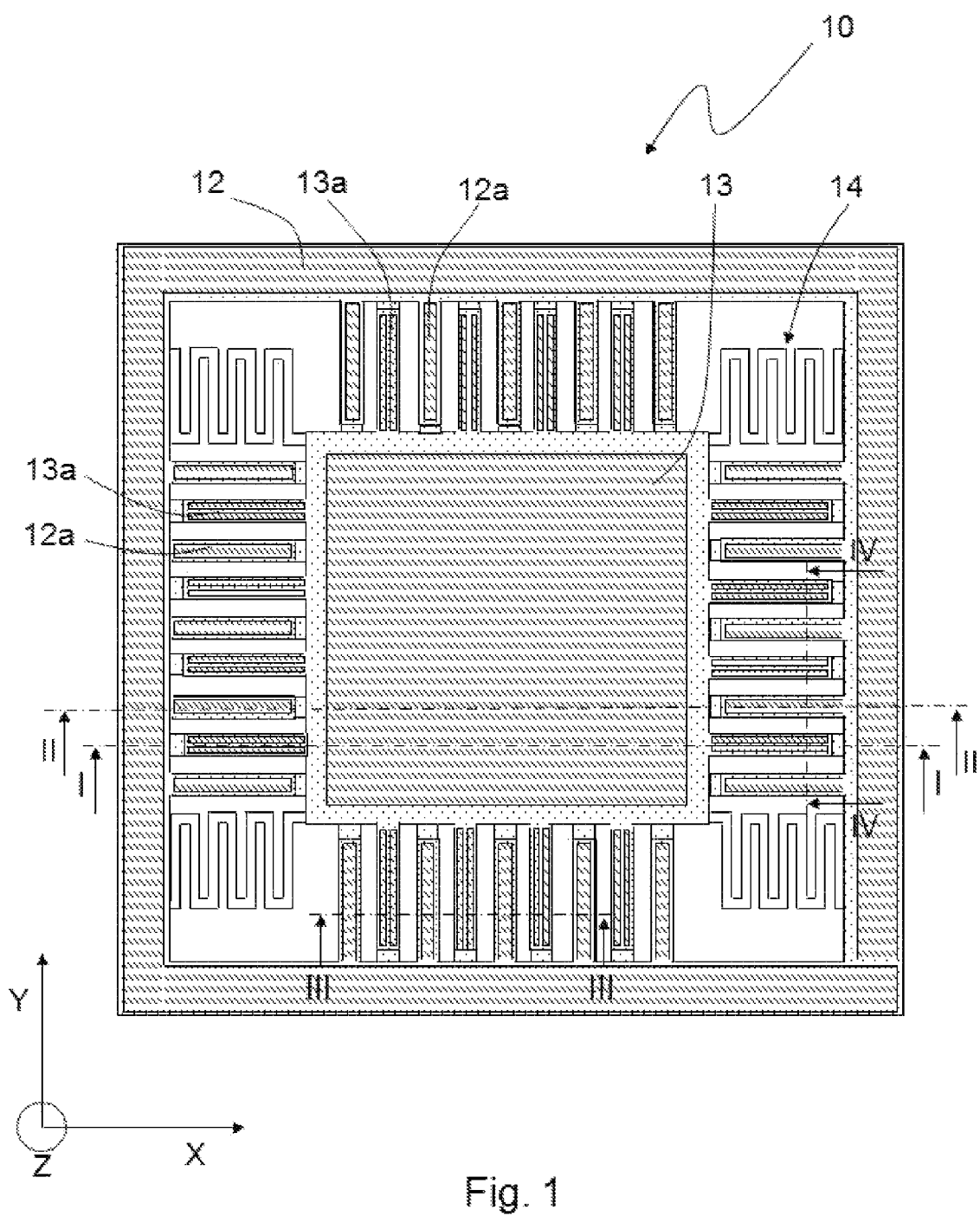
FIG. 1 shows a top view of a three-dimensional micro-electro-mechanical-system sensor illustrating an embodiment of the present invention.

FIG. 1 shows a top view of a three-dimensional micro-electro-mechanical-system sensor illustrating an embodiment of the present invention. The three-dimensional micro-electro-mechanical-system sensor 10 comprises a substrate 11 (See FIG. 2A), a fixed frame 12, a proof mass 13, and a plurality of spring parts 14. The fixed frame 12 is mounted on the substrate 11, and surrounds the proof mass 13. However, the structure of the fixed frame 12 is not limited to the example of a closed surrounding wall as shown in the figure; it can be in the form of a plurality of isolated pillars or a plurality of isolated walls in other examples. The spring parts 14 connect the outer fixed frame 12 and the inner proof mass 13. The proof mass 13 is capable of making an in-plane movement and an out-of-plane movement relative to the substrate 11 through the flexibility of the spring parts 14. An in-plane movement means a movement along the XY plane (parallel to the surface of the substrate 11), and an out-of-plane movement means a movement along the Z axis.

Figure 2A:
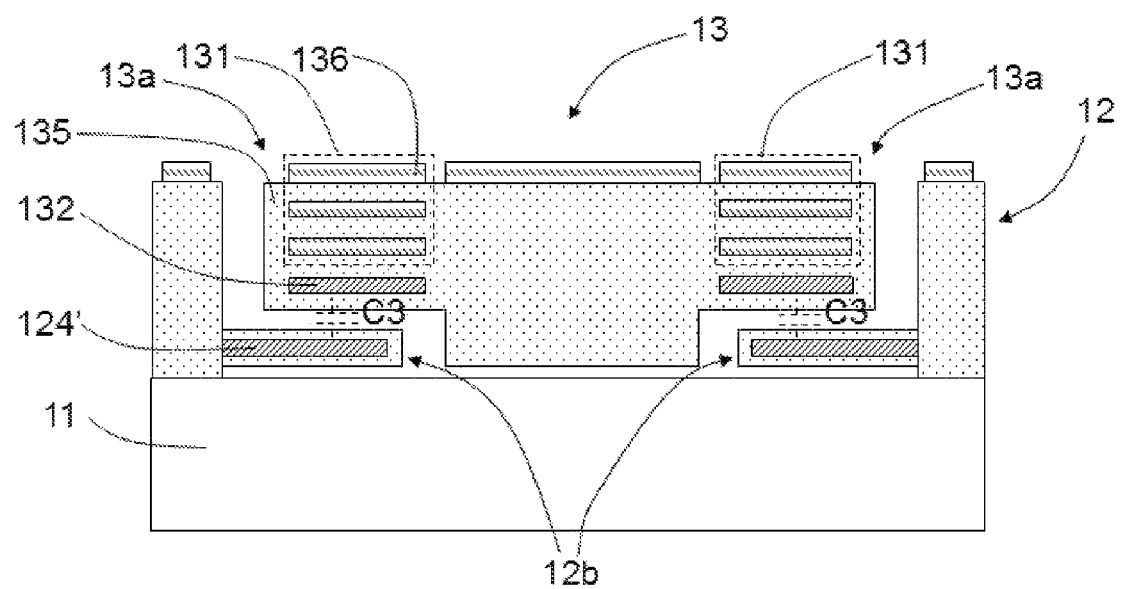
FIG. 2A is a cross-sectional diagram taken along line I-I in FIG. 1.
Figure 2B:
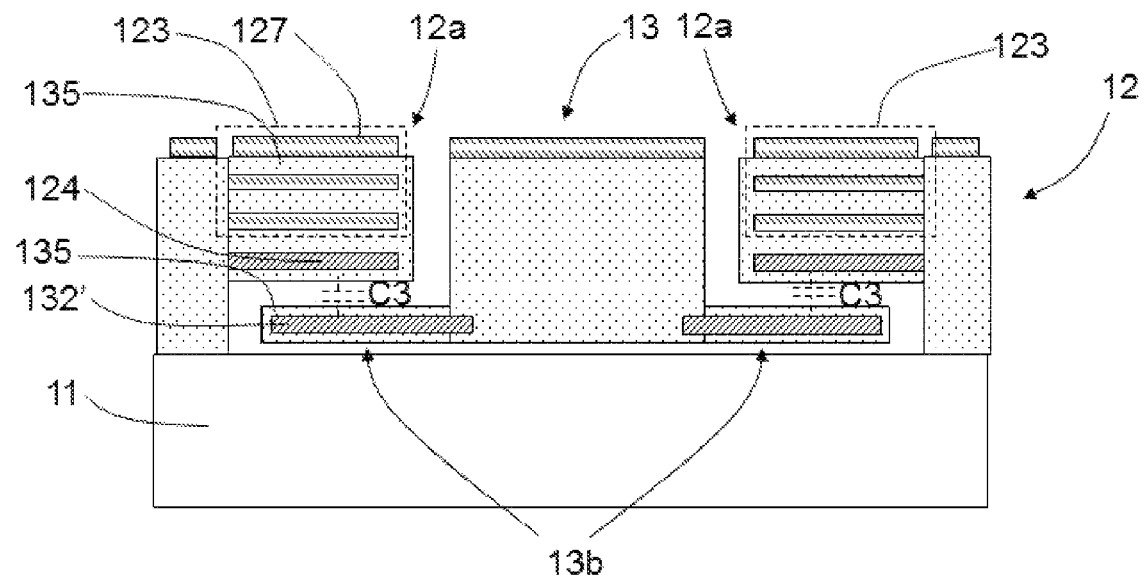
FIG. 2B is a cross-sectional diagram taken along line II-II in FIG. 1.

FIG. 2A is a cross-sectional diagram taken along line I-I in FIG. 1 and FIG. 2B is a cross-sectional diagram taken along line II-II in FIG. 1. Plural upper movable electrode parts 13a and plural lower movable electrode parts 13b are connected to the proof mass 13 and extend from the proof mass 13 towards the fixed frame 12; they move together with the proof mass 13. In the current embodiment, the upper movable electrode parts 13a and the lower movable electrode parts 13b are respectively located at different elevation levels relative to the substrate 11, and they are arranged in a staggered manner, that is, the upper movable electrode parts 13a do not overlap with the lower movable electrode parts 13b from top view. Each upper movable electrode part 13a includes at least one first electrode 131 and at least one upper second electrode 132, and each lower movable electrode part 13b includes at least one lower second electrode 132'. The first electrode 131 overlaps with the upper second electrode 132 from top view, i.e., along the vertical direction (Z axis). The upper second electrode 132 and the lower second electrode 132' are disposed on at least one and preferably four lateral sides of the proof mass 13, and do not overlap with each other along the vertical direction. The order of the arrangement of the upper second electrode 132 and the lower second electrode 132' from top view is only an example, and their positions can be interchanged. The claimed scope of the present application is not limited to the shown embodiment.

Furthermore, plural upper fixed electrode parts 12a and plural lower fixed electrode parts 12b are connected to the fixed frame 12, and extend from the fixed frame 12 towards the proof mass 13; they do not move with the proof mass 13. In the current embodiment, the upper fixed electrode parts 12a and the lower fixed electrode parts 12b are respectively located at different elevation levels relative to the substrate 11, and they are arranged in a staggered manner as shown in the top view. Each upper fixed electrode part 12a includes at least one third electrode 123 and at least one upper fourth electrode 124, and each lower fixed electrode part 12b includes at least one lower fourth electrode 124'. The third electrode 123 overlaps with the upper fourth electrode 124 along the vertical direction (Z axis). The upper fourth electrode 124 and the lower fourth electrode 124' are disposed on the internal side of the fixed frame 12 in a staggered manner, that is, they do not overlap with each other along the vertical direction.

Referring to FIG. 2A and FIG. 2B, each movable upper second electrode 132 and the corresponding fixed lower fourth electrode 124' form a third capacitor C3 (the first capacitor C1 and the second capacitor C2 will be described later). Each movable lower second electrode 132' and the corresponding fixed upper fourth electrode 124 form another third capacitor C3. In this embodiment, the lower second electrodes 132' are covered with an insulating material 135, and the lower fourth electrodes 124' are also covered with the material. Each first electrode 131 includes plural metal layers 136, and each third electrode 123 includes plural metal layers 127. The metal layers 136 and 127 are buried in the insulating material 135. Thus, according to FIG. 1, FIG. 2A and FIG. 2B, the upper movable electrode parts 13a extending from the proof mass 13 are respectively located above the corresponding lower fixed electrode parts 12b extending from the fixed frame 12, as shown in FIGS. 1 and 2A; the upper fixed electrode parts 12a extending from the frame 12 are respectively located above the corresponding lower movable electrode parts 13b extending from the proof mass 13, as shown in FIGS. 1 and 2B.

Figure 3A:
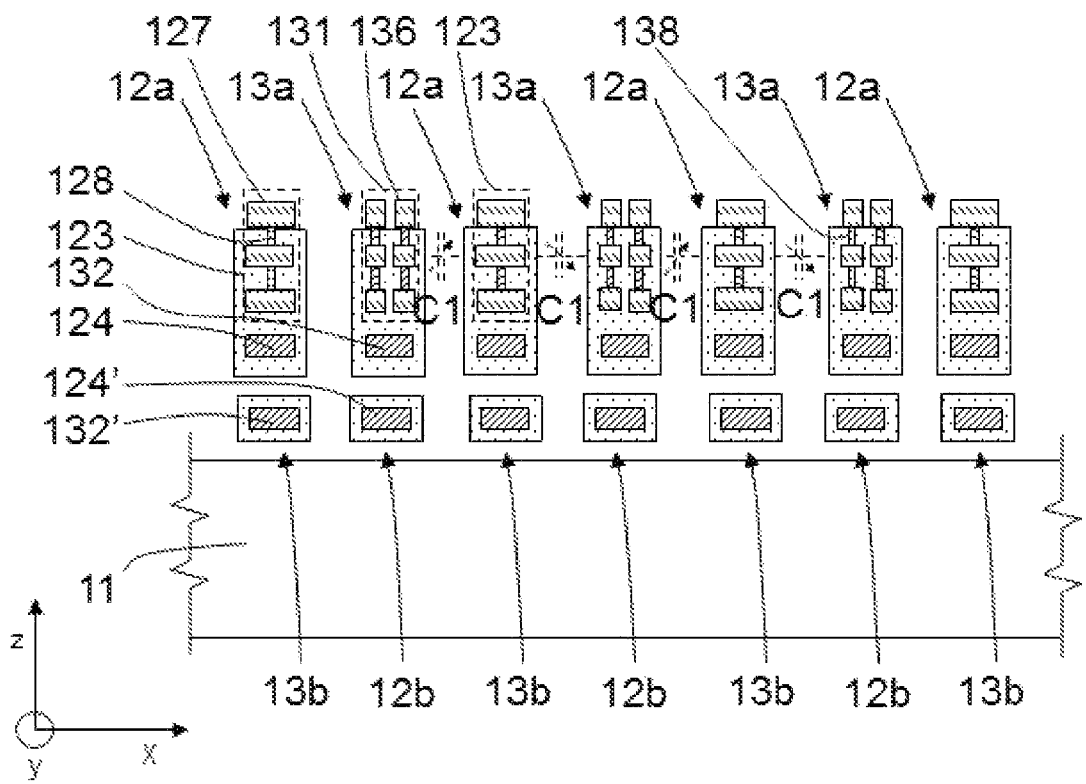
FIG. 3A is a cross-sectional diagram taken along line III-III in FIG. 1.

FIG. 3A is a cross-sectional diagram taken along line III-III in FIG. 1. The upper movable electrode parts 13a extending from the proof mass 13 and the upper fixed electrode parts 12a extending from the fixed frame 12 are disposed in alternating order. The order of the arrangement of the parts 12a and 13a can be interchanged. The first electrode 131 of the upper movable electrode part 13a and the third electrode 123 of the neighboring upper fixed electrode part 12a form a first capacitor C1. As shown in FIG. 1 and FIG. 3A, when the proof mass 13 moves along the X axis, the upper movable electrode parts 13a (See FIG. 3A) move towards the right side. Meanwhile, the capacitances of two first capacitors C1 are increased (represented by symbol "↗" in the figure), and the capacitances of another two first capacitors C1 are decreased (represented by symbol "↘" in the figure).

Figure 3B:
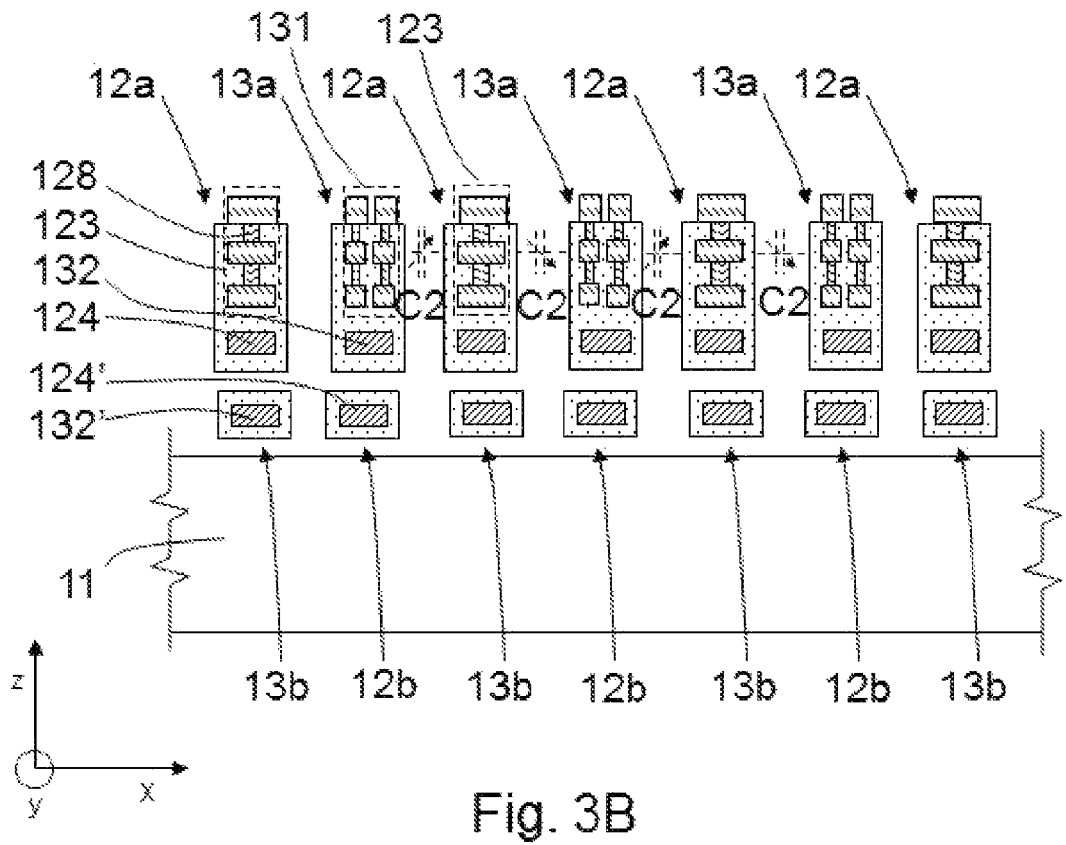
FIG. 3B is a cross-sectional diagram taken along line IV-IV in FIG. 1.

FIG. 3B is a cross-sectional diagram taken along line IV-IV in FIG. 1. The line IV-IV is perpendicular to the line Similarly, the upper movable electrode parts 13a extending from the proof mass 13 and the upper fixed electrode parts 12a extending from the fixed frame 12 are disposed in alternating order, and the order of the arrangement of the parts 12a and 13a can be interchanged. The first electrode 131 of the upper movable electrode part 13a and the third electrode 123 of the neighboring fixed electrode part 12a form a second capacitor C2. When the proof mass 13 moves along the Y axis, the upper movable electrode parts 13a (See FIG. 3B) move towards the right side. Meanwhile, the capacitances of two second capacitors C2 are increased (represented by symbol "↗" in the figure), and the capacitances of another two second capacitors C2 are decreased (represented by symbol "↘" in the figure). In view of above, a displacement of the proof mass 13 along the X axis generates a change in the capacitance of the first capacitor C1, or the change of capacitance of the first capacitor C1 indicates the acceleration of the proof mass 13 along the X axis; a displacement of the proof mass 13 along the X axis generates a change in the capacitance of the second capacitor C2, or the change of capacitance of the second capacitor C2 indicates the acceleration of the proof mass 13 along the Y axis. In the current embodiment, optionally, vertical conductive plugs 138 are provided to connect the plural metal layers 136, and vertical conductive plugs 128 are provided to connect the plural metal layers 127.

Figure 3C:
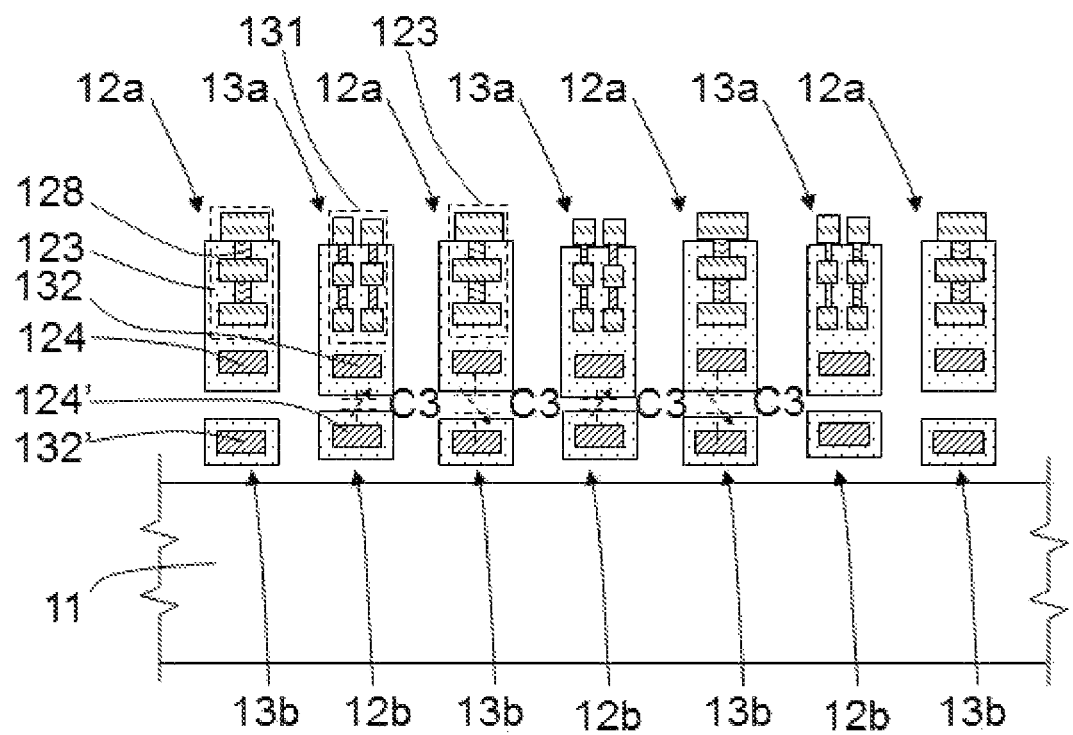
FIG. 3C is a cross-sectional diagram taken along line III-III in FIG. 1.

FIG. 3C is a cross-sectional diagram taken along line III-III in FIG. 1. Unlike FIG. 3A, FIG. 3C is for showing the operation status wherein the capacitance of the capacitor C3 varies, whereas FIG. 3A shows the operation status wherein the capacitance of the capacitor C1 varies. Referring to FIG. 1 and FIG. 3C, the lower movable electrodes 13b and the lower fixed electrode parts 12b are disposed in alternating order, and the order of the arrangement of the parts 12b and 13b can be interchanged. Each upper first electrode 132 and the corresponding lower fourth electrode 124' form a third capacitor C3, and each upper fourth electrode 124 and the corresponding lower second electrode 132' also form another third capacitor C3. When the proof mass 13 moves along the Z axis, the upper movable electrode parts 13a (See FIG. 3C) and the lower movable electrode parts 13b move downwards. Meanwhile, the capacitances of two third capacitors C3 are increased (represented by symbol "↗" in the figure), and the capacitances of another two third capacitors C3 are decreased (represented by symbol "↘" in the figure).

Figure 3D:
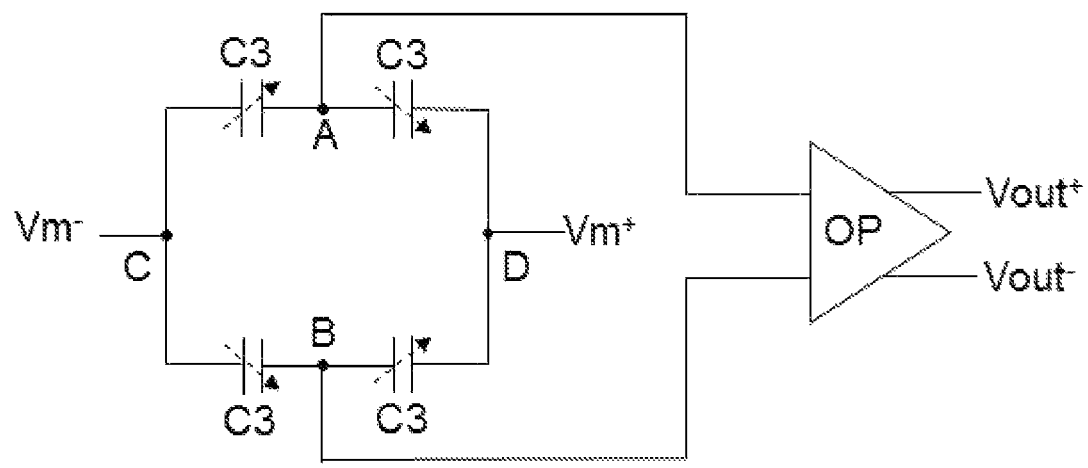
FIG. 3D shows a fully differential acceleration detection circuit.

FIG. 3D shows a fully differential acceleration detection circuit, taking the third capacitors C3 in FIG. 3C as an example. The same principle also applies to the first capacitors C1 and the second capacitors C2. Referring to FIG. 3C and FIG. 3D, when the upper movable electrode parts 13a are above the corresponding lower fixed electrode parts 12b, and the upper fixed electrode parts 12a are above the corresponding lower movable electrode parts 13b, a fully differential capacitive detection circuit having four third capacitors C3 can be configured by a proper circuit design. That is, when the proof mass 13 moves along the Z axis, the upper movable electrode parts 13a and the lower movable electrode parts 13b (See FIG. 3C) move downwards. Meanwhile, the capacitances of two third capacitors C3 are increased (represented by symbol "↗" in the figure), and the capacitances of another two third capacitors C3 are decreased (represented by symbol "↘" in the figure).

In FIG. 3D, the nodes C and D are respectively coupled to high frequency voltages $V_m^-$ and $V_m^+$ with a phase difference of 180 degree. When the proof mass 13 is stationary, the capacitances of the capacitors C3 do not vary, so the operation amplifier OP outputs voltage signals corresponding to the difference between $V_m^+$ and $V_m^-$. When the proof mass 13 moves towards the substrate, the displacement or acceleration causes the capacitances of the four third capacitors C3 to vary as shown by the directions of the arrows in the figure. The voltages generated by the low frequency variations of the four capacitances are combined with the input voltage, and hence, the operation amplifier OP outputs amplified signals having high and low frequency components. The output signals ($V_{out}^+$, $V_{out}^-$) include the high frequency component from the input and the low frequency component from the varied capacitance caused by the acceleration. Such a fully differential acceleration detection circuit can improve the sensitivity of the MEMS device, and reduce the noise of the third capacitor C3 and the cross-talk between the electrodes of C1 and C2.

Figure 4A:
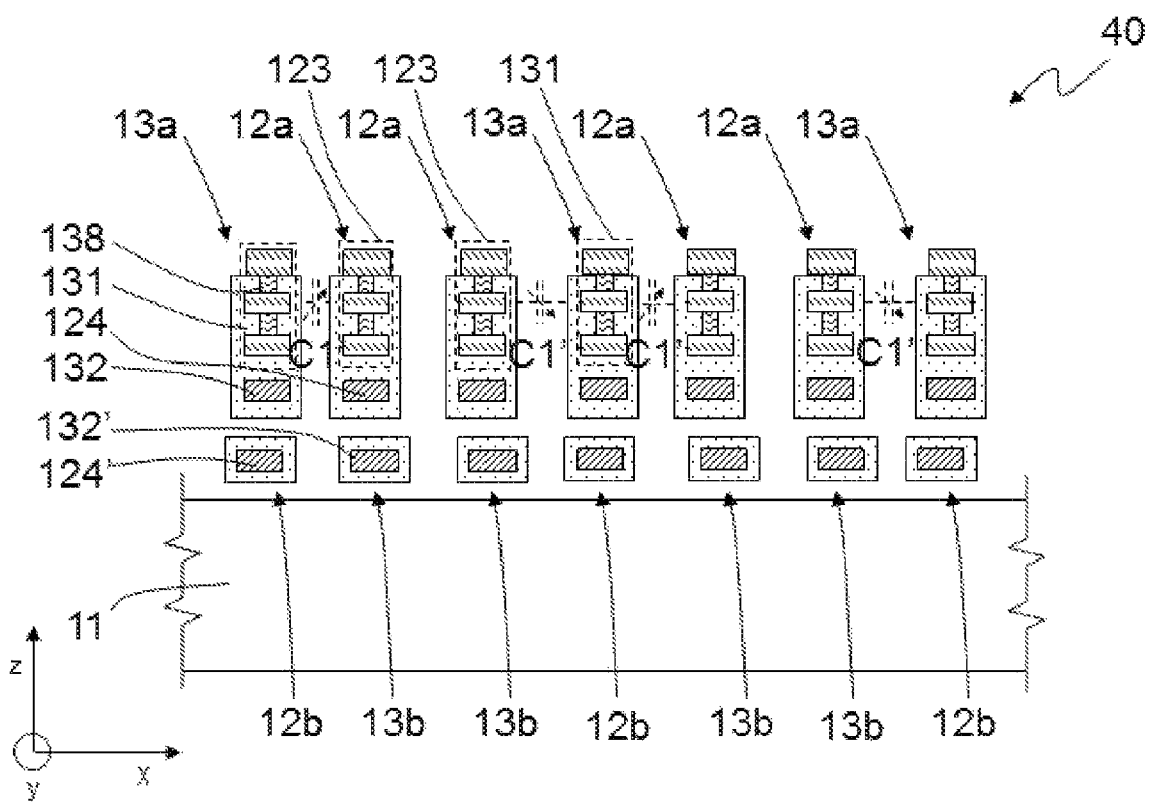
FIG. 4A shows a cross-sectional diagram of a three-dimensional micro-electro-mechanical-system sensor illustrating another embodiment of the present invention.

FIG. 4A shows a cross-sectional diagram of a three-dimensional micro-electro-mechanical-system sensor illustrating another embodiment of the present invention. Referring to the three-dimensional MEMS sensor 40 in the figure, between two of the upper movable electrode parts 13a, there are two upper fixed electrodes 12a; and between two lower fixed electrode parts 12b, there are two lower movable electrode parts 13b. When the three-dimensional MEMS sensor 40 moves along the X axis, the upper movable electrode parts 13a (See FIG. 4A) move rightwards. Meanwhile, the capacitances of two first capacitors C1' are increased (represented by symbol "↗" in the figure), and the capacitances of another two first capacitors C1' are decreased (represented by symbol "↘" in the figure). Note that, of the two middle adjacent first capacitors C1', one has an increased capacitance and the other has a decreased capacitance.

Figure 4B:
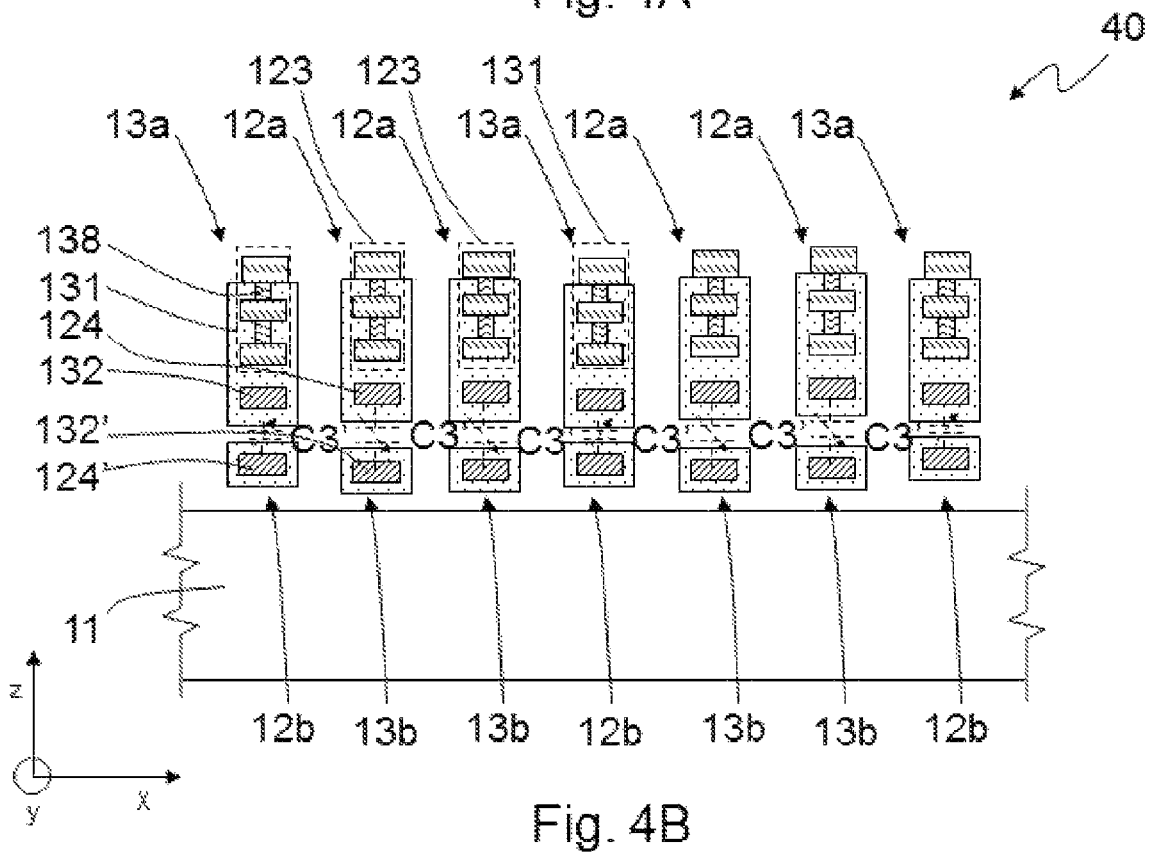
FIG. 4B is a cross-sectional diagram of the three-dimensional micro-electro-mechanical-system sensor in FIG. 4A.

FIG. 4B is a cross-sectional diagram of the three-dimensional micro-electro-mechanical-system sensor in FIG. 4A. Unlike FIG. 4A, FIG. 4B shows the operation status wherein the three-dimensional MEMS sensor 40 moves along the Z axis, whereas FIG. 4A shows the operation status wherein the three-dimensional MEMS sensor 40 moves along the X axis. Referring to the three-dimensional MEMS sensor 40 in FIG. 4B, the two lower movable electrode parts 13b between the two lower fixed electrode parts 12b move downwards, and the movable electrode parts 13a also move downwards. Thus, the capacitances of the third capacitors C3' vary accordingly. More specifically, when the lower second electrode 132' of the lower movable electrode part 13b moves downwards, it is away from the lower fourth electrode 124 of the upper fixed electrode parts 12a. Thus, the capacitance of the third capacitor C3' between the lower second electrode 132' and the lower fourth electrode 124 is reduced. Similarly, when the upper second electrode 132 of the upper movable electrode part 13a moves downwards, it is closer to the lower fourth electrode 124' of the lower fixed electrode parts 12b. Thus, the capacitance of the third capacitor C3' between the lower second electrode 132 and the lower fourth electrode 124' is increased.

Figure 4C:
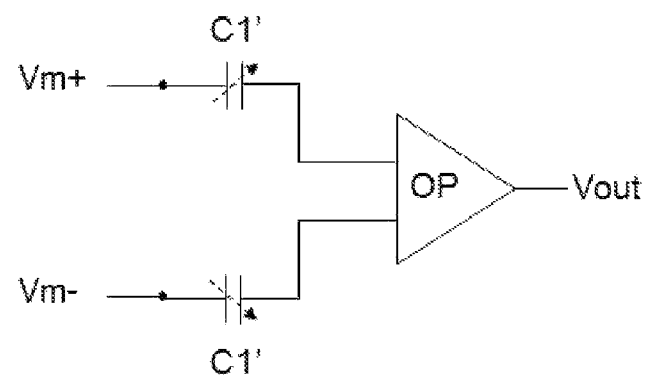
FIG. 4C shows a differential acceleration detection circuit.

FIG. 4C shows a differential acceleration detection circuit which is different from the fully differential acceleration detection circuit in FIG. 3D. The operation amplifier OP compares the voltages at its input terminals, which include components of the low frequency capacitance variations of the two first capacitors C1' and the components of the high frequency input voltages Vm+ and Vm−, and generates an output signal. The low frequency component in the output signal can represent the acceleration on the X axis. Similar circuits can be arranged for the second capacitors C2' and the third capacitors C3'.

Figure 5A:
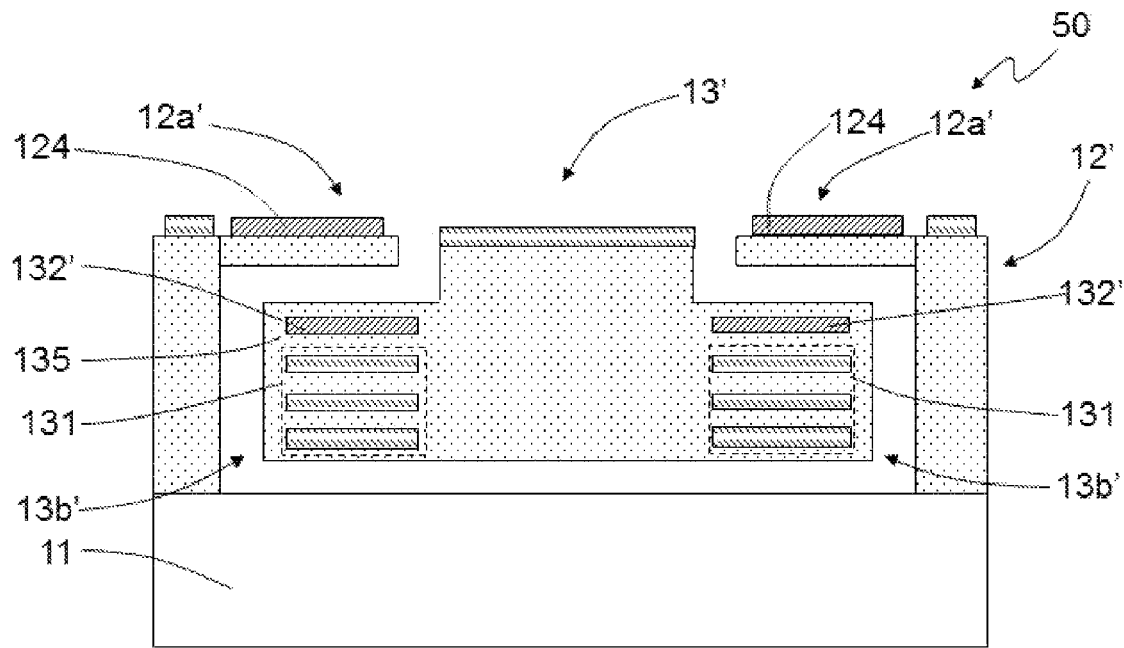
FIG. 5A shows a cross-sectional diagram of a three-dimensional micro-electro-mechanical-system sensor illustrating another embodiment of the present invention.
Figure 5B:
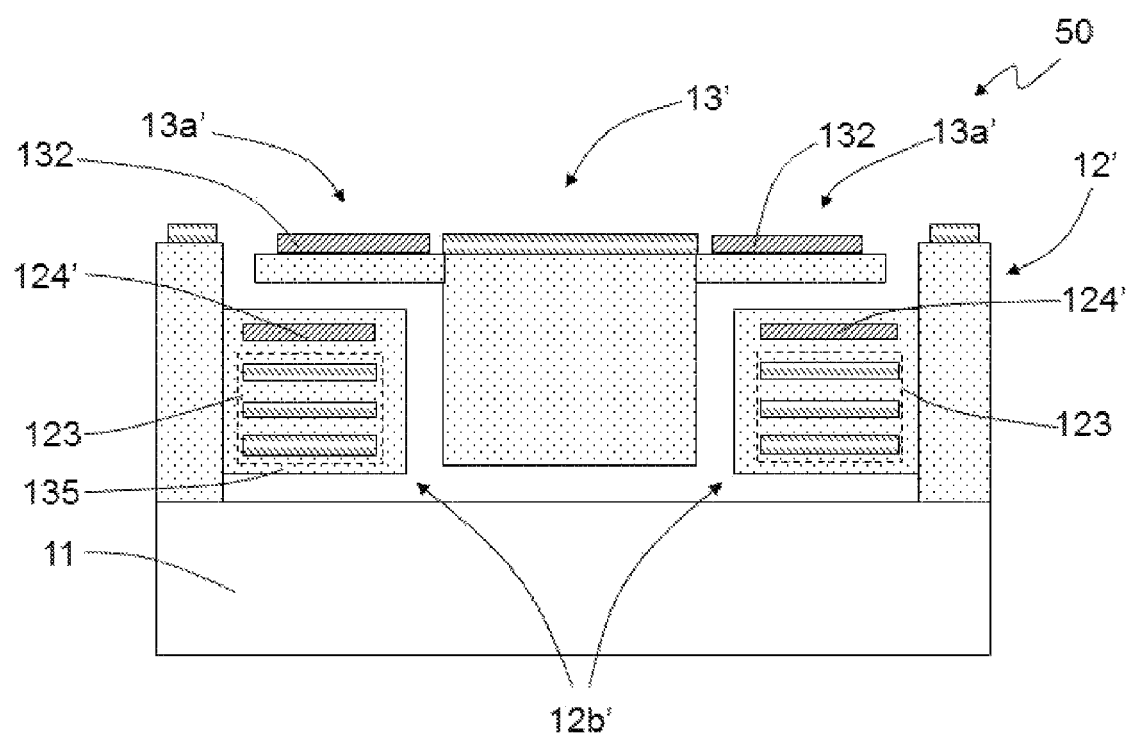
FIG. 5B shows another cross-sectional diagram of the three-dimensional micro-electro-mechanical-system sensor in FIG. 5A.

FIG. 5A shows a cross-sectional diagram of a three-dimensional micro-electro-mechanical-system sensor illustrating another embodiment of the present invention. FIG. 5B shows another cross-sectional diagram of the three-dimensional micro-electro-mechanical-system sensor in FIG. 5A. Referring to the figures, the three-dimensional MEMS sensor 50 include plural upper movable electrode parts 13a' and plural lower movable electrode parts 13b' which extend from the proof mass 13' towards the fixed frame 12'. They are connected to the proof mass 13', so they move together with the proof mass 13'. Each lower movable electrode part 13b' includes at least one first electrode 131 and at least one lower second electrode 132', and each upper movable electrode part 13a' includes at least one of upper second electrode 132. The first electrode 131 and the lower second electrode 132' overlap with each other along the vertical direction (Z axis). The upper second electrodes 132 and the lower second electrodes 132' are disposed on at least one and preferably four lateral sides of the proof mass 13' in a staggered manner, that is, the upper second electrodes 132 do not overlap with the lower second electrodes 132' along the vertical direction.

Furthermore, plural upper fixed electrode parts 12a' and plural fixed electrode parts 12b' extend from the proof mass 13' towards the fixed frame 12', and they are connected to the fixed frame 12', so they do not move with the proof mass 13'. Each lower fixed electrode part 12b' includes at least one third electrode 123 and at least one lower fourth electrode 124', and each upper fixed electrode part 12a' includes at least one upper fourth electrode 124. The third electrode 123 and the upper fourth electrode 124 overlaps with each other along the vertical direction (Z axis). The upper fourth electrodes 124 and the lower fourth electrodes 124' are disposed on the internal side of the fixed frame 12' in a staggered manner, that is, the upper fourth electrodes 124 do not overlap with the lower fourth electrodes 124' along the vertical direction.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the fixed electrode parts and the movable electrode parts can be arranged in a manner different from the example shown in the embodiments; for instance, two or more fixed electrode parts can be disposed between two movable electrode parts. Moreover, the shapes of the fixed electrode and the movable electrode, and their relative positions for forming a capacitor, are not limited to what are disclosed by the foregoing embodiments. The present invention should cover all such and other modifications and variations, which should be interpreted to fall within the scope of the following claims and their equivalents.

What is claimed is:

1. A three-dimensional micro-electro-mechanical-system sensor, comprising:
   a substrate;
   a fixed frame fixed on the substrate;
   a proof mass;
   at least one spring part connecting the fixed frame and the proof mass;
   a plurality of first electrodes and a plurality of second electrodes respectively extending from the proof mass toward the fixed frame; and
   a plurality of third electrodes and a plurality of fourth electrodes respectively extending from the fixed frame toward the proof mass, wherein the first electrodes and the third electrodes form at least one first capacitor and at least one second capacitor, and the second electrodes and the fourth electrodes form at least one third capacitor,
   wherein a displacement of the proof mass along a first axis generates a change in the capacitance of the first capacitor, a displacement of the proof mass along a second axis generates a change in the capacitance of the second capacitor, a displacement of the proof mass along a third axis generates a change in the capacitance of the third capacitor, and the first, second, and third axes define a three-dimensional coordinate system; the first electrodes overlap with the fourth electrodes along the direction of the third axis, and the third electrodes overlap with the second electrodes along the direction of the third axis.

2. The three-dimensional micro-electro-mechanical-system sensor of claim 1, wherein there is at least one third electrode between two adjacent first electrodes.

3. The three-dimensional micro-electro-mechanical-system sensor of claim 2, wherein the second electrodes include a plurality of upper second electrodes and a plurality of lower second electrodes, and the upper second electrodes and the lower second electrodes are disposed on at least a lateral side of the proof mass in a manner that the upper second electrodes do not overlap with the lower second electrodes along the direction of the third axis.

4. The three-dimensional micro-electro-mechanical-system sensor of claim 3, wherein the fourth electrodes include a plurality of upper fourth electrodes and a plurality of lower fourth electrodes, and the upper fourth electrodes and the lower fourth electrodes are disposed on an internal side of the fixed frame in a manner that the upper fourth electrodes do not overlap with the lower fourth electrodes along the direction of the third axis.

5. The three-dimensional micro-electro-mechanical-system sensor of claim 4, wherein at least one upper second electrode and at least one lower fourth electrode overlap with each other along the third axis to form the third capacitor, and at least one lower second electrode and at least one upper fourth electrode overlap with each other along the third axis to form another third capacitor.

6. The three-dimensional micro-electro-mechanical-system sensor of claim 1, wherein there are at least two third electrodes between two adjacent first electrodes.

7. The three-dimensional micro-electro-mechanical-system sensor of claim 6, wherein the second electrodes include a plurality of upper second electrodes and a plurality of lower second electrodes, and there are two lower second electrodes between two adjacent upper second electrodes, the upper second electrodes and the lower second electrodes being disposed on a lateral side of the proof mass and the upper second electrodes do not overlap with the lower second electrodes along the direction of the third axis.

8. The three-dimensional micro-electro-mechanical-system sensor of claim 7, wherein the fourth electrodes include a plurality of upper fourth electrodes and a plurality of lower fourth electrodes, and there are two lower fourth electrodes between two upper fourth electrodes, the upper fourth electrodes and the lower fourth electrodes being disposed on an internal side of the fixed frame and the upper fourth electrodes do not overlap with the lower fourth electrodes along the direction of the third axis.

9. The three-dimensional micro-electro-mechanical-system sensor of claim 8, wherein at least one upper second electrode and at least one lower fourth electrode overlap with each other along the third axis to form the third capacitor, and at least one lower second electrode and at least one upper fourth electrode overlap with each other along the third axis to form another third capacitor.

10. The three-dimensional micro-electro-mechanical-system sensor of claim 1, wherein the first electrodes and the third electrodes extend along the direction of the first axis or the direction of the second axis.

11. The three-dimensional micro-electro-mechanical-system sensor of claim 1, further comprising a fully differential acceleration detection circuit which detects differential signals generated from (a) four first capacitors, (b) four second electrodes, or (c) four third electrodes and amplifies the differential signals.

12. The three-dimensional micro-electro-mechanical-system sensor of claim 1, further comprising a differential acceleration detection circuit which detects differential signals of (a) two first capacitors, (b) two second electrodes, or (c) two third electrodes and amplifies the differential signals.

13. The three-dimensional micro-electro-mechanical-system sensor of claim 1, wherein the fourth electrodes are at least partially between the first electrodes and the substrate.

14. The three-dimensional micro-electro-mechanical-system sensor of claim 13, wherein the second electrodes are at least partially between the first electrodes and the substrate.

15. The three-dimensional micro-electro-mechanical-system sensor of claim 1, wherein the fourth electrodes are at least partially between the third electrodes and the substrate.

16. The three-dimensional micro-electro-mechanical-system sensor of claim 15, wherein the third electrodes are between the fourth electrodes and the substrate.

17. The three-dimensional micro-electro-mechanical-system sensor of claim 16, wherein the first electrodes are between the second electrodes and the substrate.

18. The three-dimensional micro-electro-mechanical-system sensor of claim 1, wherein there are four spring parts which symmetrically connect the proof mass and the fixed frame.

19. The three-dimensional micro-electro-mechanical-system sensor of claim 1, wherein the fixed frame is in the form of a closed surrounding wall, a plurality of pillars, or a plurality of walls.

20. The three-dimensional micro-electro-mechanical-system sensor of claim 1, wherein the proof mass is movable in an in-plane direction and an out-of-plane direction relative to the plane defined by the first axis and the second axis.

21. A three-dimensional micro-electro-mechanical-system sensor, comprising:
a substrate;
a fixed frame fixed on the substrate;
a proof mass;
at least one spring part connecting the fixed frame and the proof mass;
a plurality of first electrodes and a plurality of second electrodes respectively extending from the proof mass toward the fixed frame; and
a plurality of third electrodes and fourth electrodes respectively extending from the fixed frame toward the proof mass,
wherein:
the first electrodes and the third electrodes arranged along a first axis form at least one first capacitor,
the first electrodes and the third electrodes arranged along a second axis form at least one second capacitor,
a portion of the second electrodes overlapping a portion of the fourth electrodes along a third axis to form at least one third capacitor,
the first, second, and third axes are perpendicular to one another; and
the first electrodes overlap with the fourth electrodes along the direction of the third axis, and the third electrodes overlap with the second electrodes along the direction of the third axis.

22. The three-dimensional micro-electro-mechanical-system sensor of claim 21, wherein a displacement of the proof mass along the first axis generates a change in the capacitance of the first capacitor; a displacement of the proof mass along the second axis generates a change in the capacitance of the second capacitor; and a displacement of the proof mass along the third axis generates a change in the capacitance of the third capacitor, and the first, second, and third axes define a three-dimensional coordinate system.

* * * * *